United States Patent
Shi et al.

(10) Patent No.: US 11,885,641 B2
(45) Date of Patent: Jan. 30, 2024

(54) ELASTICALLY SUPPORTED ELECTRODE SUBSTRATE FOR DETECTING UNBALANCED MASS OF RESONANT GYROSCOPE

(71) Applicant: NATIONAL UNIVERSITY OF DEFENSE TECHNOLOGY, Changsha (CN)

(72) Inventors: Yan Shi, Changsha (CN); Dingbang Xiao, Changsha (CN); Kun Lu, Changsha (CN); Xiang Xi, Changsha (CN); Xuezhong Wu, Changsha (CN); Yulie Wu, Changsha (CN); Yongmeng Zhang, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 18/110,384

(22) Filed: Feb. 16, 2023

(65) Prior Publication Data
US 2023/0392956 A1    Dec. 7, 2023

(30) Foreign Application Priority Data
Jun. 2, 2022    (CN) .......................... 202210618508.2

(51) Int. Cl.
*G01C 25/00*    (2006.01)
*G01C 19/5783*    (2012.01)

(52) U.S. Cl.
CPC ....... *G01C 25/005* (2013.01); *G01C 19/5783* (2013.01)

(58) Field of Classification Search
CPC ... G01C 25/005; G01C 19/5783; G01M 1/12; G01M 1/14
See application file for complete search history.

(56) References Cited

U.S. PATENT DOCUMENTS

| | | | |
|---|---|---|---|
| 6,571,630 B1* | 6/2003 | Weinberg | G01C 25/005 73/1.37 |
| 2010/0116050 A1 | 5/2010 | Wolfram | |
| 2018/0188030 A1* | 7/2018 | Shang | G01C 19/5691 |

FOREIGN PATENT DOCUMENTS

| | | |
|---|---|---|
| CN | 104165624 A | 11/2014 |
| CN | 108844555 A | 11/2018 |

(Continued)

OTHER PUBLICATIONS

Tao Yunfeng, et al., Survey of Balancing Technology for Hemispherical Resonator Gyroscopes, Flight Control & Detection, 2021, pp. 11-21, vol. 4, No. 1.

(Continued)

*Primary Examiner* — Peter J Macchiarolo
*Assistant Examiner* — John M Royston
(74) *Attorney, Agent, or Firm* — Bayramoglu Law Offices LLC

(57) ABSTRACT

An elastically supported electrode substrate for detecting unbalanced mass of a resonant gyroscope includes an outer frame and an inner structure. A connection part configured to be connected to an anchor of a resonator is arranged at the center of the inner structure, and electrodes are distributed on the inner structure. The inner structure is connected inside the outer frame through elastic beams, and the inner structure has torsional and/or translational resonant modes inside the outer frame. The resonant frequency of the inner structure approaches resonant frequency of an operating mode of the resonator. Since the resonant frequency of the elastically supported electrode substrate approaches the resonant frequency of the operating mode of the resonator, the vibration displacement induced by the unbalanced mass of the elastically supported electrode substrate can be significantly magnified to improve the detection sensitivity.

9 Claims, 2 Drawing Sheets

(56) References Cited

FOREIGN PATENT DOCUMENTS

| CN | 110672081 A | 1/2020 |
| CN | 113551691 A | 10/2021 |
| JP | 2002031532 A | 1/2002 |
| WO | 2016206152 A1 | 12/2016 |

OTHER PUBLICATIONS

Junji Pu, et al., Miniature optical force levitation system, Chinese Optics Letters, 2022, pp. 013801-1-013801-6, vol. 20, No. 1.

* cited by examiner

ELASTICALLY SUPPORTED ELECTRODE SUBSTRATE FOR DETECTING UNBALANCED MASS OF RESONANT GYROSCOPE

CROSS REFERENCE TO THE RELATED APPLICATIONS

This application is based upon and claims priority to Chinese Patent Application No. 202210618508.2, filed on Jun. 2, 2022, the entire contents of which are incorporated herein by reference.

TECHNICAL FIELD

The present invention relates to the technical field of resonant gyroscope manufacturing, particularly an elastically supported electrode substrate for detecting unbalanced mass of a resonant gyroscope.

BACKGROUND

As a sensor to measure the angular motion of a carrier in inertial space, the gyroscope is the basic core device of an inertial navigation and attitude determination system and shows important application in precision guidance, unmanned system, oil prospecting, stable platform, space vehicle, and other fields.

A resonant gyroscope is a kind of gyroscope that has been widely used due to its advantages of few parts, high reliability, and long lifetime. A resonator is a sensitive element of the resonant gyroscope, and the resonance characteristics of the resonator directly determine the performance upper limit of the resonant gyroscope. A frequency-matched resonant gyroscope is a specific type of resonant gyroscope, and its typical characteristic is that the difference between the resonant frequency of the driving mode and the resonant frequency of the detection mode is smaller than the bandwidth of the two modes during the operation of the frequency-matched resonant gyroscope. A geometric shape of a resonator of an ideal frequency-matched resonant gyroscope has an axisymmetric structure, such that the resonant frequency of the driving mode and the resonant frequency of the detection mode are equal, and the resonance displacement is symmetrical. However, in practical manufacturing process, due to the mismatch in size and shape of the materials and structures, the geometric shape and the resonance displacement of the resonator are not symmetrical, and unbalanced mass is usually used to describe the symmetry mismatch of the resonator.

The unbalanced mass brings the difference between the resonant frequency of the driving mode and the resonant frequency of the detection mode of the resonator, which reduces the sensitivity of the gyroscope and causes a quadrature error. In addition, the unbalanced mass causes the centroid of the resonator oscillating in the driving mode or the detection mode, and the oscillation of the centroid reduces the quality factor of the resonator and reduces the dynamic performance of the gyroscope in shock and vibration environment.

Mass rebalancing is an important step in the manufacturing process of a resonant gyroscope, which aims to reduce and eliminate the unbalanced mass of the resonator. The mass rebalancing process includes two steps: detecting the unbalanced mass and trimming the unbalanced mass. The specific position and size of the unbalanced mass are first detected, and then the unbalanced mass is reduced and eliminated by removing or adding mass to improve the performance of the gyroscope. Detecting the unbalanced mass is an important step in mass rebalancing, and the measurement accuracy directly determines the accuracy of the mass rebalancing.

SUMMARY

The present invention provides an elastically supported electrode substrate for detecting unbalanced mass of a resonant gyroscope, which can measure the unbalanced mass of a frequency-matched resonant gyroscope and provide technical support for mass rebalancing.

To achieve the above objective, the present invention provides an elastically supported electrode substrate for detecting an unbalanced mass of a resonant gyroscope, including an outer frame and an inner structure. A connection part configured to be connected to anchor of the resonator is arranged at the center of the inner structure, and electrodes are distributed on the inner structure.

The inner structure is connected inside the outer frame through elastic beams, and the inner structure has several resonance modes, include torsional modes and torsional modes. The resonant frequency of the inner structure approaches the resonant frequency of operating mode of the resonator.

In an embodiment, a gap is formed between the inner contour edges of the outer frame and the outer contour edges of the inner structure.

The inner contour edges of the outer frame and the outer contour edges of the inner structure are connected by a plurality of elastic beams, and the plurality of elastic beams are annularly and uniformly distributed between the inner contour edges of the outer frame and the outer contour edges of the inner structure at an interval.

In an embodiment, the elastic beam includes a first plate, a second plate, and a folded elastic structure.

One end of the first plate is connected to the top or the bottom of the outer contour edge of the inner structure, and the other end of the first plate is connected to one end of the elastic substrate. The other end of the elastic substrate is connected to one end of the second plate, and the other end of the second plate is connected to the top or the bottom of the inner contour edge of the outer frame.

In an embodiment, trench recessed toward the center of the inner structure is formed at the position of the outer contour edge of the inner structure corresponding to the elastic beam.

An end of the elastic beam is connected to the corresponding trench of the outer contour edge of the inner structure.

In an embodiment, the outer frame, the inner structure, and the elastic beams are formed by processing the same integral material.

In an embodiment, the elastically supported electrode substrate for detecting the unbalanced mass of the resonant gyroscope further includes a support frame. The outer frame is fixedly connected to the support frame, and the inner structure and the elastic beams are located directly above the inner frame of the support frame.

The present invention provides an elastically supported electrode substrate for detecting an unbalanced mass of a resonant gyroscope. Since the resonant frequency of the elastically supported electrode substrate approaches the resonant frequency of the operating mode of the resonator, the vibration displacement induced by the unbalanced mass of the elastically supported electrode substrate can be significantly magnified to improve the detection sensitivity. By detecting the resonance displacement of multiple positions on the elastically supported electrode substrate, the resonance displacement of the elastically supported electrode substrate in multiple directions can be calculated, and various unbalanced masses of the resonator of the resonant gyroscope can be measured and identified.

BRIEF DESCRIPTION OF THE DRAWINGS

To clearly illustrate the technical solutions in the embodiments of the present invention or the prior art, the drawings used in the description of the embodiments or the prior art are briefly introduced below. The drawings described below are only some embodiments of the present invention. For those having ordinary skill in the art without applying inventive effort, other drawings may also be obtained according to the structures shown in these drawings.

REFERENCING NUMERALS OF THE FIGURES

Figure 1:
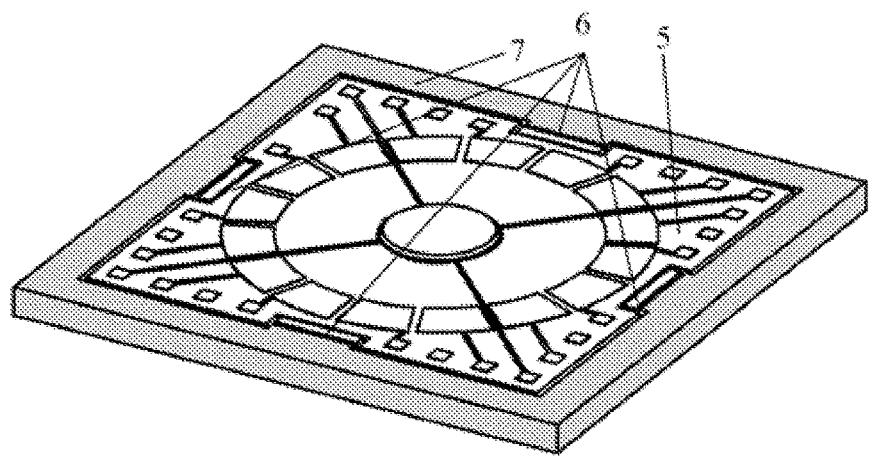
FIG. 1 is an axonometric diagram of an elastically supported electrode substrate according to an embodiment of the present invention.
Figure 2:
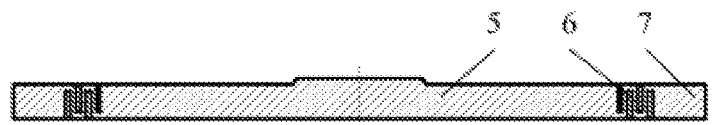
FIG. 2 is a cross-sectional view of the elastically supported electrode substrate according to an embodiment of the present invention.
Figure 3:
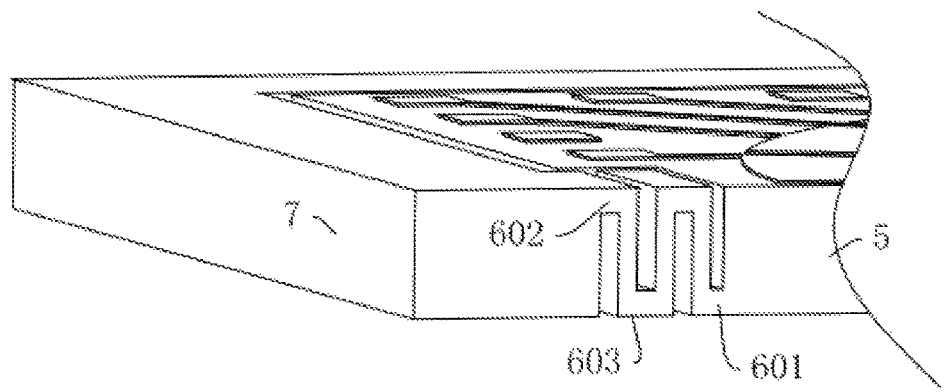
FIG. 3 is an enlarged view of a connection structure of an elastic beam according to an embodiment of the present invention.
Figure 4:
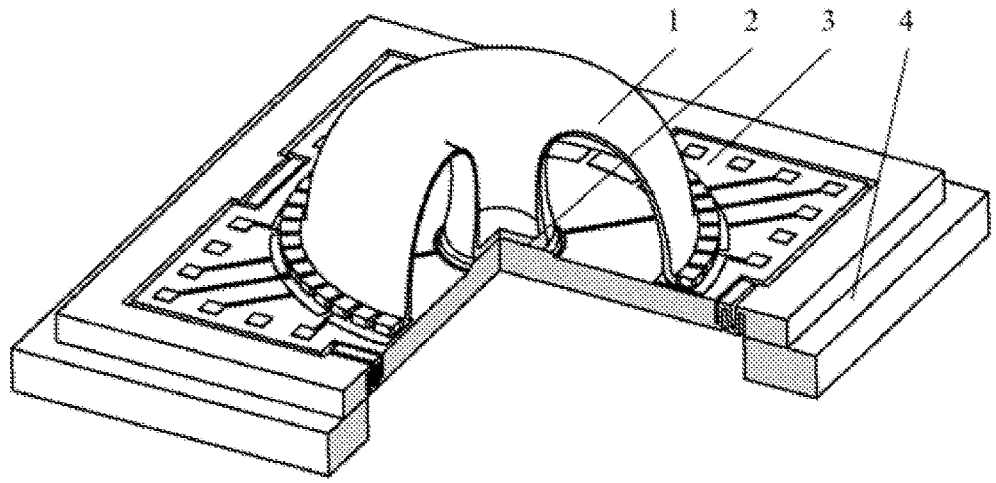
FIG. 4 is a three-quarters axonometric diagram of the elastically supported electrode substrate with a support frame according to an embodiment of the present invention.
Figure 5:
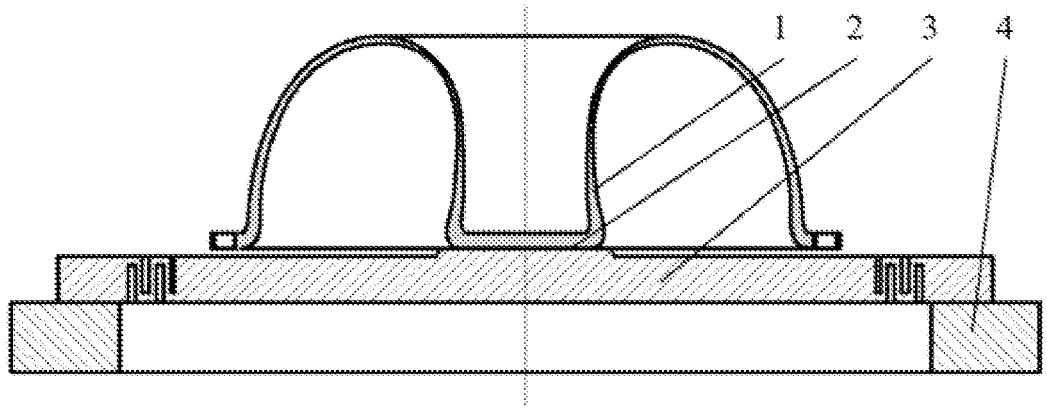
FIG. 5 is a cross-sectional view of the elastically supported electrode substrate with the support frame according to an embodiment of the present invention.

Resonator 1, anchor 2, elastically supported electrode substrate 3, support frame 4, inner structure 5, elastic beam 6, first plate 601, second plate 602, elastic structure 603, outer frame 7, and sensitive electrode 8.

The realization, functional features, and advantages of the present invention will be further explained in the embodiments with references to the drawings.

DETAILED DESCRIPTION OF THE EMBODIMENTS

The technical solutions in the embodiments of the present invention are described clearly and completely below in conjunction with the drawings in the embodiments of the present invention. The described embodiments are only part of the embodiments of the present invention, not all embodiments. Based on the embodiments of the present invention, all other embodiments obtained by those having ordinary skill in the art without inventive effort shall fall within the scope of protection of the present invention.

It should be noted that all directional instructions in the embodiments of the present invention, such as top, bottom, left, right, front, back, etc., are only configured to explain the relative position relationships, motion, and other situations between the components under a particular positioning (as shown in the drawings). If the particular positioning changes, the directional indication changes accordingly.

In addition, the descriptions related to "first", "second", and the like in the present invention are used only for descriptive purposes and cannot be understood as indicating or implying their relative importance or implicitly indicating the number of indicated technical features. Thus, a feature defined as "first" and "second" may include at least one of the features either expressly or implicitly. In the description of the present invention, "a plurality of" means at least two, such as two, three, etc., unless otherwise clearly and specifically defined.

In the present invention, unless otherwise clearly specified and defined, the terms "connection" and "fixed" should be understood in a broad sense. For example, "fixed" may be a fixed connection, a detachable connection, or to form an integral whole; it may be a mechanical connection, an electrical connection, a physical connection or a wireless communication connection; it may be a direct connection, an indirect connection through an intermediate medium, an internal connection of two elements, or an interaction of two elements, unless otherwise clearly defined. For those having ordinary skill in the art, the specific meaning of the above terms in the present invention may be understood according to the specific circumstances.

In addition, the technical solutions of the various embodiments of the present invention may be combined, which must be based on the realization of those having ordinary skill in the art. When the combination of technical solutions occurs in contradiction or cannot be realized, it should be considered that such a combination of the technical solutions does not exist and does not fall within the scope of protection of the present invention.

As shown in FIGS. 1-5, the embodiment discloses an elastically supported electrode substrate (hereinafter referred to as the elastically supported electrode substrate 3) for detecting an unbalanced mass of a resonant gyroscope, which is suitable for a frequency-matched resonant gyroscope. The resonator 1 of the frequency-matched resonant gyroscope (hereinafter referred to as the resonator 1) is fixedly installed on the specially-designed elastically supported electrode substrate 3, such that the inertia force introduced by the unbalanced mass of the resonator 1 in the resonant state causes the elastically supported electrode substrate 3 to resonate, and the unbalanced mass of the resonator 1 can be measured according to the resonance displacement of the elastically supported electrode substrate 3.

In the embodiment, the elastically supported electrode substrate 3 includes the outer frame 7 and the inner structure 5. A connection part configured to be connected to the anchor 2 of the resonator 1 is arranged at the center of the inner structure 5, and the connection part is a protruding structure. Electrodes for mode excitation and resonance amplitude detection of the resonator 1 are uniformly distributed on the inner structure 5, and the electrode arrangement is the same as the conventional electrode arrangement. The inner structure 5 is connected inside the outer frame 7 through the elastic beams 6. When the anchor 2 of the resonator 1 is connected to the connection part, the inertia force introduced by the unbalanced mass of the resonator 1 in the resonant state causes the inner structure 5 to have a resonant stroke of a torsional pendulum and/or a translational movement inside the outer frame 7, that is, the inner structure 5 has a torsional pendulum mode and a translation mode in the outer frame 7. Moreover, the resonant frequency of the inner structure 5 approaches the resonant frequency of the operating mode of the resonator 1, such that the resonance amplitude of the elastically supported electrode substrate 3 in the torsional pendulum mode and the translation mode can be amplified, thereby improving the measurement sensitivity. Specifically, by using electrostatic leveling, mechanical trimming, and the like, the difference between the resonant frequency of one or more modes of the inner structure 5 in the elastically supported electrode substrate 3 and the resonant frequency of the operating mode of the resonator 1 is smaller than the bandwidth of the mode of the elastically supported electrode substrate 3 (that is, the resonant frequency of the inner structure 5 approaches the resonant frequency of the operating mode of the resonator 1), thereby achieving the purpose of improving the detection sensitivity.

In the embodiment, both the outer frame 7 and the inner structure 5 are rectangular, and the thickness of the outer frame 7 is equal to the thickness of the inner structure 5. The inner contour edges of the outer frame 7 are in one-to-one correspondence with the outer contour edges of the inner structure 5, and a gap is formed between the inner contour edges of the outer frame 7 and the corresponding outer contour edges of the inner structure 5. Each outer contour edge of the inner structure 5 is connected to the corresponding inner contour edge of the outer frame 7 through one elastic beam 6. One end of the elastic beam 6 is connected to the middle of the corresponding outer contour edge of the inner structure 5, and the other end of the elastic beam 6 is connected to the middle of the corresponding inner contour edge of the outer frame 7.

The resonator 1 is excited by static electricity or other methods to activate the driving mode or the detection mode. The driving mode and the detection mode are collectively referred to as operating modes. When the gyroscope operates normally, the difference between the resonant frequency of the driving mode and the resonant frequency of the detection mode is less than the bandwidth of the aforementioned two modes. The angular velocity is measured through the resonance displacement of one of the modes, or the angle is measured through the resonance direction of the mode. The unbalanced mass refers to the asymmetrical error generated by deviations in the material or shape of the frequency-matched resonant gyroscope during the manufacturing process, and the unbalanced mass is a non-ideal factor that needs to be suppressed and eliminated in the manufacture of the frequency-matched resonant gyroscope. When the unbalanced mass is measured, the resonator 1 is excited to an operating mode and is in a resonant state. The inertia force introduced by the unbalanced mass causes the anchor 2 of the resonator 1 to resonate, and the resonance of the anchor 2 is transferred to the elastically supported electrode substrate 3 to allow the inner structure 5 of the elastically supported electrode substrate 3 to resonate. Then, the resonant frequency of one of the modes of the elastically supported electrode substrate 3 is adjusted to be within the bandwidth of the resonant mode of the resonator 1 by using electrostatic frequency modulation, mechanical trimming, or other methods. Then, the resonance displacement of the aforementioned mode of the elastically supported electrode substrate 3 is measured using electrostatic capacitance measurement, laser Doppler vibrometer, piezoelectric effect measurement, or other methods. Then, the resonance direction of the resonator 1 is adjusted, and the resonance displacement of the aforementioned mode of the elastically supported electrode substrate 3 is measured. After the measurement is completed, the control on the resonant frequency of the aforementioned mode of the elastically supported electrode substrate 3 is removed. According to this method, the resonance displacement of the torsional pendulum mode and the translation mode of the elastically supported electrode substrate 3 are measured in sequence. According to a plurality of measurement results of the resonance displacement of the elastically supported electrode substrate 3, the resonance amplitudes of the inner structure 5 of the elastically supported electrode substrate 3 in different directions can be calculated, and the unbalanced mass of the resonator 1 can be calculated according to the resonance amplitudes.

In a specific implementation process, the elastic beam 6 includes the first plate 601, the second plate 602, and the folded elastic structure 603. One end of the first plate 601 is connected to the top of the middle of the corresponding outer contour edge of the inner structure 5, the other end of the first plate 601 is connected to one end of the elastic structure 603. The other end of the elastic structure 603 is connected to one end of the second plate 602, and the other end of the second plate 602 is connected to the bottom of the middle of the corresponding inner contour edge of the outer frame 7. Alternatively, one end of the first plate 601 is connected to the bottom of the middle of the corresponding outer contour edge of the inner structure 5, and the other end of the first plate 601 is connected to one end of the elastic structure 603. The other end of the elastic structure 603 is connected to one end of the second plate 602, and the other end of the second plate 602 is connected to the top of the middle of the corresponding inner contour edge of the outer frame 7. Of course, in the process of a practical application, the two ends of the elastic beam 6 may be both connected to the top or both connected to the bottom.

In the embodiment, trench recessed toward the center of the inner structure 5 is formed at the middle of the outer contour edge of the inner structure 5, and an end of the elastic beam 6 is connected to the trench of the corresponding outer contour edge of the inner structure 5. In this way, the length of the elastic beam 6 can be increased in a cavity with a small gap between the inner contour edge of the outer frame 7 and the corresponding outer contour edge of the inner structure 5.

In the embodiment, the outer frame 7, the inner structure 5, and the elastic beams 6 are integrally formed, which is realized by wafer lithography and dry etching.

Figure 6:
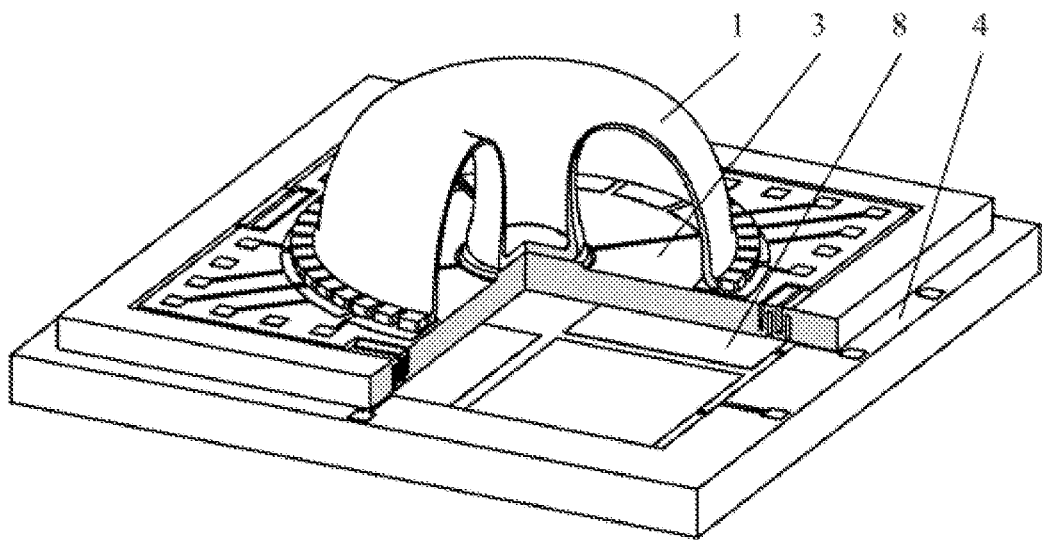
FIG. 6 is a three-quarters axonometric diagram of the elastically supported electrode substrate when an unbalanced mass is detected by an electrostatic capacitance detection according to an embodiment of the present invention.
Figure 7:
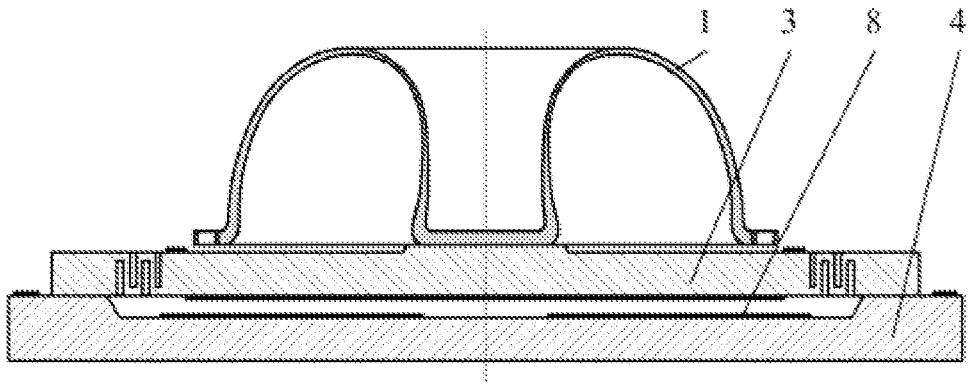
FIG. 7 is a cross-sectional view of the elastically supported electrode substrate when the unbalanced mass is detected by an electrostatic capacitance detection according to an embodiment of the present invention.

In a specific implementation process, the elastically supported electrode substrate 3 further includes the support frame 4. The outer frame 7 is fixedly connected to the support frame 4, and the inner structure 5 and the elastic beams 6 are located directly above the inner frame of the support frame 4. Referring to FIGS. 6 and 7, when the unbalanced mass is measured, the electrostatic capacitance can be used to detect the resonance displacement of the elastically supported electrode substrate 3, that is, the sensitive electrode 8 configured to measure the resonance displacement is provided in the support frame 4 when manufactured, and a small gap is formed between the elastically supported electrode substrate 3 and the support frame 4 to form a plate capacitor. The resonance displacement of the inner structure 5 can be calculated through the change in the electrostatic capacitance of the sensitive electrode 8. Further preferably, when the unbalanced mass is measured, a direct-current voltage can be applied on a part of the sensitive electrode 8 of the support frame 4, and the resonant frequency of the elastically supported electrode substrate 3 is reduced due to the electrostatic negative stiffness effect, such that the difference between the resonant frequency of the elastically supported electrode substrate 3 and the operating frequency of the resonator 1 is reduced, thereby achieving the purpose of improving the detection sensitivity.

The above only describes the preferred embodiments of the present invention and therefore does not limit the scope of protection of the present invention. Under the conception of the present invention, the equivalent structural variation made by using the contents of the description and the drawings of the present invention or direct/indirect application in other related technical fields shall fall within the protection scope of the present invention.

What is claimed is:

1. An elastically supported electrode substrate for detecting an unbalanced mass of a resonant gyroscope, comprising:
   an outer frame and an inner structure,
   a connection part connected to an anchor of a resonator of the resonant gyroscope arranged at a center of the inner structure, and
   electrodes distributed on the inner structure;
   wherein the inner structure is connected inside the outer frame through elastic beams, the inner structure has a resonant stroke of a torsional pendulum and/or a translational movement inside the outer frame, and a difference between a resonant frequency of a mode of the inner structure in the elastically supported electrode substrate and a resonant frequency of an operating mode of the resonator is smaller than a bandwidth of the mode of the elastically supported electrode substrate.

2. The elastically supported electrode substrate for detecting the unbalanced mass of the resonant gyroscope according to claim 1, wherein a gap is formed between inner contour edges of the outer frame and outer contour edges of the inner structure; and
   the inner contour edges of the outer frame and the outer contour edges of the inner structure are connected by a plurality of elastic beams, and the plurality of elastic beams are annularly and uniformly distributed between the inner contour edges of the outer frame and the outer contour edges of the inner structure at an interval.

3. The elastically supported electrode substrate for detecting the unbalanced mass of the resonant gyroscope according to claim 1, wherein the elastic beam comprises a first plate, a second plate, and a folded elastic structure; wherein
   one end of the first plate is connected to a top or a bottom of the outer contour edge of the inner structure, the other end of the first plate is connected to one end of the folded elastic structure, the other end of the folded elastic structure is connected to one end of the second plate, and the other end of the second plate is connected to a top or a bottom of the inner contour edge of the outer frame.

4. The elastically supported electrode substrate for detecting the unbalanced mass of the resonant gyroscope according to claim 2, wherein a trench recessed toward the center of the inner structure is formed at a position of the outer contour edge of the inner structure corresponding to the elastic beam; and
   an end of the elastic beam is connected to the corresponding trench of the outer contour edge of the inner structure.

5. The elastically supported electrode substrate for detecting the unbalanced mass of the resonant gyroscope according to claim 4, wherein the outer frame, the inner structure, and the elastic beams are formed by processing a same integral material.

6. The elastically supported electrode substrate for detecting the unbalanced mass of the resonant gyroscope according to claim 1, further comprising a support frame, wherein the outer frame is fixedly connected to the support frame, and the inner structure and the elastic beams are located directly above an inner frame of the support frame.

7. The elastically supported electrode substrate for detecting the unbalanced mass of the resonant gyroscope according to claim 3, wherein a trench recessed toward the center of the inner structure is formed at a position of the outer contour edge of the inner structure corresponding to the elastic beam; and
   an end of the elastic beam is connected to the corresponding trench of the outer contour edge of the inner structure.

8. The elastically supported electrode substrate for detecting the unbalanced mass of the resonant gyroscope according to claim 2, further comprising a support frame, wherein the outer frame is fixedly connected to the support frame, and the inner structure and the elastic beams are located directly above an inner frame of the support frame.

9. The elastically supported electrode substrate for detecting the unbalanced mass of the resonant gyroscope according to claim 3, further comprising a support frame, wherein the outer frame is fixedly connected to the support frame, and the inner structure and the elastic beams are located directly above an inner frame of the support frame.

* * * * *